(12) United States Patent
Broussard, Jr. et al.

(10) Patent No.: US 10,627,026 B2
(45) Date of Patent: Apr. 21, 2020

(54) FITTINGS, COMPONENTS, AND ASSOCIATED TOOLS

(71) Applicant: 3SC Global, LLC, Kilgore, TX (US)

(72) Inventors: Don William Broussard, Jr., Wynne, AR (US); Ronald Kent Swain, Kensett, AR (US); Jeffery Allen Bess, Longview, TX (US); Johnnie Rae Burrows, Longview, TX (US); Jerad Norman Richardson, Gladewater, TX (US)

(73) Assignee: 3SC Global, LLC, Kilgore, TX (US)

( * ) Notice: Subject to any disclaimer, the term of this patent is extended or adjusted under 35 U.S.C. 154(b) by 411 days.

(21) Appl. No.: 15/372,925

(22) Filed: Dec. 8, 2016

(65) Prior Publication Data

US 2017/0167644 A1 Jun. 15, 2017

Related U.S. Application Data

(60) Provisional application No. 62/265,656, filed on Dec. 10, 2015.

(51) Int. Cl.
| | |
|---|---|
| *F16L 19/025* | (2006.01) |
| *E21B 17/04* | (2006.01) |
| *F16L 19/02* | (2006.01) |
| *F16B 23/00* | (2006.01) |
| *B25G 1/10* | (2006.01) |
| *B25B 23/00* | (2006.01) |
| *B25G 1/06* | (2006.01) |
| *F16B 21/04* | (2006.01) |

(Continued)

(52) U.S. Cl.
CPC ............ *F16L 19/025* (2013.01); *E21B 17/04* (2013.01); *F16B 23/0069* (2013.01); *F16L 19/02* (2013.01); *B25B 13/5091* (2013.01); *B25B 23/0028* (2013.01); *B25B 27/10* (2013.01); *B25G 1/063* (2013.01); *B25G 1/105* (2013.01); *F16B 21/04* (2013.01)

(58) Field of Classification Search
CPC ......... F16L 19/025; F16L 19/02; E21B 17/04; F16B 33/02; F16B 23/0069
USPC ............. 285/90, 91, 354, 386, 388; 411/435
See application file for complete search history.

(56) References Cited

U.S. PATENT DOCUMENTS 2,726,104 A * 12/1955 Boitnott .................... 285/354 X
2,764,428 A 9/1956 Murphy
(Continued)

FOREIGN PATENT DOCUMENTS

GB 2273167 B 11/1995
WO 9715814 A1 5/1997
(Continued)

*Primary Examiner* — Zachary T Dragicevich
(74) *Attorney, Agent, or Firm* — Buss & Benefield, PLLC; Michael Benefield

(57) ABSTRACT

Fittings that generally include a unitary body having an outer surface and an inner lumen forming a void within said unitary body. The lumen is configured to receive threads for mating with the threads of a female sub end of a pipe or tube. The outer surface includes at least one aperture for receiving a tool that can be inserted within said aperture so as to rotate the fitting about an axis that extends through the lumen of the unitary body. The at least one apertures provide a safe and convenient way to tighten and loosen the fitting during the process of coupling pipe or tubing.

13 Claims, 7 Drawing Sheets

(51) Int. Cl.
B25B 27/10 (2006.01)
B25B 13/50 (2006.01)

(56) References Cited

U.S. PATENT DOCUMENTS

| | | | |
|---|---|---|---|
| 3,058,761 A | 10/1962 | Christophersen | |
| 3,743,325 A | 7/1973 | Schlarb | |
| 3,752,507 A | 8/1973 | Maurer | |
| 4,648,627 A * | 3/1987 | Reimert | E21B 17/04 285/91 X |
| 4,830,408 A * | 5/1989 | Reimert | |
| 5,131,300 A | 7/1992 | Daniel | |
| 5,170,659 A | 12/1992 | Kemp | |
| 5,333,911 A * | 8/1994 | Watkins | 285/90 X |
| 6,024,491 A | 2/2000 | Bak | |
| 6,764,109 B2 | 7/2004 | Richardson et al. | |
| 6,923,254 B2 | 8/2005 | Morrow et al. | |
| 6,945,569 B1 | 9/2005 | Diaz et al. | |
| 7,213,660 B2 | 5/2007 | Martin | |
| D603,017 S | 10/2009 | Nimberger | |
| D609,999 S | 2/2010 | Andersson | |
| D694,078 S | 11/2013 | Dumaine et al. | |
| D721,335 S | 1/2015 | Smeja | |
| 9,186,780 B2 | 11/2015 | Dumaine et al. | |
| 9,522,459 B2 | 12/2016 | Cook | |
| 2003/0015840 A1 | 1/2003 | Davis | |
| 2004/0207159 A1 | 10/2004 | Morrow et al. | |
| 2004/0245727 A1 | 12/2004 | Bunn | |
| 2005/0206090 A1 | 9/2005 | Bunn | |
| 2006/0042789 A1 | 3/2006 | Kubala | |
| 2007/0251703 A1 | 11/2007 | Riley et al. | |
| 2008/0136168 A1 | 6/2008 | Ungchusri et al. | |
| 2009/0152006 A1 | 6/2009 | Leduc et al. | |
| 2013/0161941 A1 * | 6/2013 | Zulauf | F16L 19/02 |
| 2014/0260817 A1 | 9/2014 | Wilson et al. | |
| 2014/0374122 A1 * | 12/2014 | Fanguy | F16L 19/025 |
| 2015/0226355 A1 | 8/2015 | Ungchusri et al. | |
| 2015/0231768 A1 | 8/2015 | Francis et al. | |
| 2015/0369415 A1 | 12/2015 | Bond, Jr. et al. | |
| 2016/0039042 A1 * | 2/2016 | Riggs | |
| 2016/0339563 A1 | 11/2016 | Wilson | |

FOREIGN PATENT DOCUMENTS

| | | |
|---|---|---|
| WO | 02101191 A2 | 12/2002 |
| WO | 2004051004 A2 | 6/2004 |
| WO | 2010089572 A1 | 12/2010 |
| WO | 2013170178 A2 | 11/2013 |

* cited by examiner

FITTINGS, COMPONENTS, AND ASSOCIATED TOOLS

CROSS-REFERENCE TO RELATED APPLICATIONS

This application claims the benefit of U.S. Provisional Patent Application Ser. No. 62/265,656, filed Dec. 10, 2015, which is hereby incorporated herein by reference in its entirety.

BACKGROUND

1. Field of the Invention

The present invention is generally directed to fittings, components, and associated tools for use in coupling pipe and tubing.

2. General Background of the Invention

Pipe and tubing unions have many applications in fluid handling services. Such applications include potable water applications, such as joining copper tubing together, as well as more hazardous and sophisticated applications, such as joining piping together for hazardous service operations at high pressure.

One type of union that has gained popularity is the hammer union. As shown in FIGS. 1-2, the hammer union has a nut 1 that is disposed around a male sub end 3. The male sub end has a flange 5 that is configured to mate with a female sub end 7. The flange 5 has a diameter that is sufficient to permit the nut 1 to slide over the flange so as to dispose the nut on the male sub end 3. After placing the nut over the male sub end flange 5, a set of segments 9 can be mated together over the male sub end 3, and held in place with snap ring 11. The segments include a lip 13 that prevents the nut from sliding over the male sub end flange 5. Segments are not always used, however, such as where the male sub end flange is large enough to catch the hammer union nut and prevent it from sliding off the end of the male sub end.

Turning now to FIG. 2, after the segments are in place, the nut is tightened by first manually aligning the threads on the nut with the threads on the female sub end 7, and thereafter hitting three tabs on the nut with a sledge hammer until achieving a seal. Once the service application is complete, the pipe can be decoupled, again by use of a sledge hammer to loosen the fitting.

Problems can arise, however, from the use of hammer unions. For example, hammer unions are susceptible to fatigue caused by the repeated hitting of the nut part of the fitting with a sledge hammer. In some instances, the fatigue in the fitting can make it more difficult to form the seal between the male and female sub ends. In other instances, the fatigue can also lead to hairline cracks in the fitting. When leaks occur during operation of a system, a user has a tendency to again hit the hammer union nut with a sledge hammer in order to further tighten the union's seal to stop the leak. Under certain known high pressure oil and gas services, the hit to a fatigued hammer union under service conditions has caused an explosion to occur, which has unfortunately resulted in the death of those around the fitting.

Attempts have been made to overcome these and other deficiencies in hammer unions. For example, U.S. Pat. No. 6,764,109 to Richardson et al. discloses disposition of an o-ring seal between the female and male sub ends of a hammer union, so as to help prevent leakage via compression of the o-ring as the union is tightened.

U.S. Patent Application Serial No. 2015/0226355 to Ungchusri et al. discloses a hammer union that locates a plurality of load segments between a hammer union nut and the male sub end in order to help withstand horizontal loads occurring when the hammer union is assembled, thereby reducing fatigue in the union.

U.S. Pat. No. 6,945,569 to Diaz et al. discloses a hammer union where a segment interfaces with the union's nut and the male sub end flange in a conical arrangement in order to reduce stress in the nut segment so as to prevent deformation of the nut section of the union.

U.S. Pat. No. 9,186,780 to Dumaine et al. and U.S. Patent Application Serial No. 2014/0260817 to Wilson et al. disclose wrenches that can be disposed around the tabs of a hammer union to tighten and loosen the union without imparting the fatigue caused by the use of a sledge hammer.

U.S. Patent Application Serial No. 2008/0136168 to Ungchusri discloses a modified hammer union nut that includes a web having impact holes for receiving a sliding hammer that can be used to tighten and loosen the nut.

U.S. Patent Application Serial No. 2015/0369415 to Bond et al. discloses a restraint system for securing temporary flow lines that contain hammer union fittings. The system includes endless loop slings that are secured to the flow lines in order to arrest movement of the flow lines during a catastrophic failure of the flow line system.

In view of the background in this area, there remain needs for improved and/or alternative fittings, components, and associated tools for use in coupling pipe and tubing. The present invention is addressed to those needs.

SUMMARY OF THE INVENTION

In one aspect, the invention relates to a fitting for use in coupling pipe or tubing. The fitting includes a unitary body that has a length, a distal end, a proximal end, an outer surface, and a lumen. The outer surface extends around the length of the unitary body between the proximal and distal ends of the body. The lumen extends within the unitary body in a distal direction from the unitary body's proximal end such that the lumen defines a void within the unitary body. A portion of the lumen is cylindrical and includes threads that are configured to receive a threaded female sub end of a pipe or tube. The unitary body further includes at least one aperture that extends from the outer surface of the unitary body and ends at a location within the unitary body. The at least one aperture is configured to receive a tool for rotating the fitting around an axis extending between the proximal and distal ends of the unitary body so as to permit the tightening and loosening of the fitting to a threaded female sub end of a pipe or tube.

In another aspect, the invention relates to a casting for a fitting for use in coupling pipe or tubing. The casting includes a unitary body having a length, a distal end, a proximal end, an outer surface, and a lumen. The outer surface of the unitary body extends around the unitary body's length between the proximal and distal ends of the unitary body. The lumen extends within the unitary body in a distal direction from the proximal end of the unitary body to form a void within the unitary body. The outer surface includes eight raised portions, each of which extends radially outwardly from the center line of the lumen that extends between the proximal and distal ends of the unitary body so as to raise the outer surface of the unitary body at each raised portion. Each raised portion is also configured for boring so as to create an aperture in each of the raised portions. Additionally, a portion of the lumen is cylindrically shaped such that it is configured to receive threading to permit receipt of a threaded female sub end of a pipe or tube.

In yet another aspect, the invention includes a tool for use in tightening or loosening a fitting that couples pipe or tubing. The tool includes a bar having an elongate body occupying a cylindrical shape and having a proximal end and a distal end. The tool also includes a bell head that has a proximal end and a distal end, where the proximal end of the bell head includes an aperture that is configured to receive the distal end of the elongate bar. The aperture is configured to affix the distal end of the elongate bar such that the elongate bar can swing back and forth in a bi-directional manner within the aperture. The bell head also includes a distal end that is configured for insertion into an aperture of a fitting for use in coupling pipe or tubing.

DETAILED DESCRIPTION

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and further applications of the principles of the invention as described herein being contemplated as would normally occur to one skilled in the art to which the invention relates.

Figure 2:
FIG. 2 provides a perspective view of a prior art hammer union.
Figure 1:
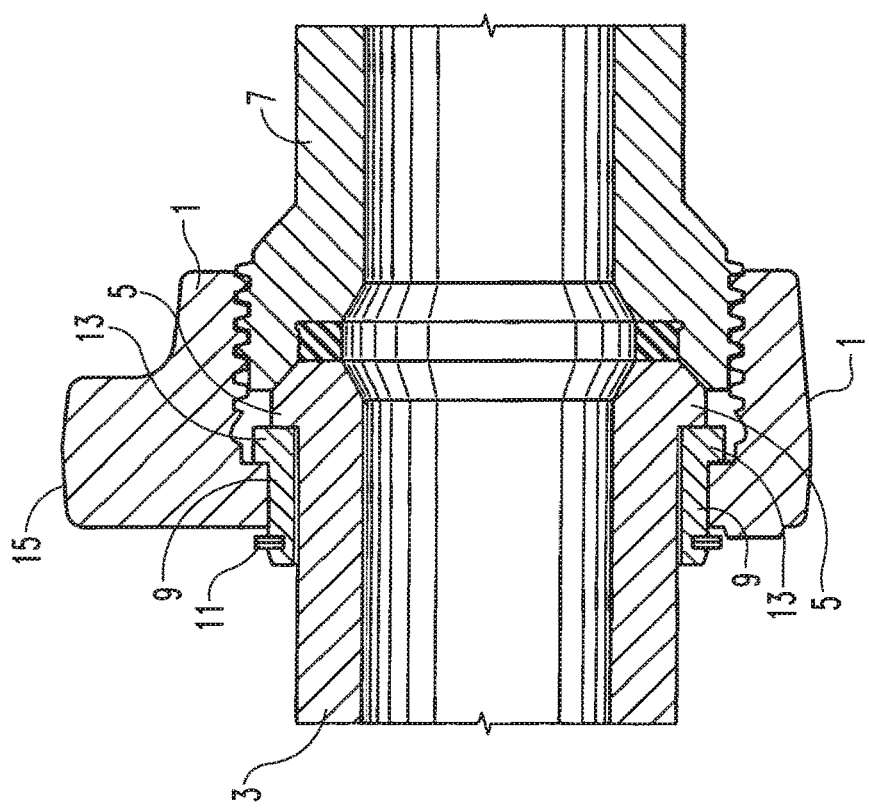
FIG. 1 provides a cross-sectional view of a prior art hammer union.
Figure 3B:
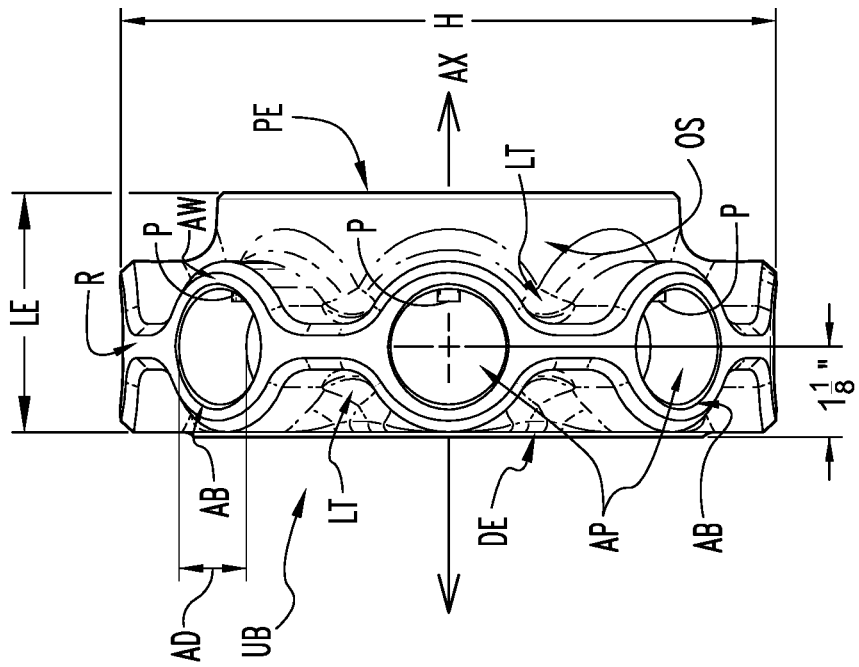
FIG. 3B provides a right hand elevation view of the illustrative embodiment in FIG. 3A.
Figure 3A:
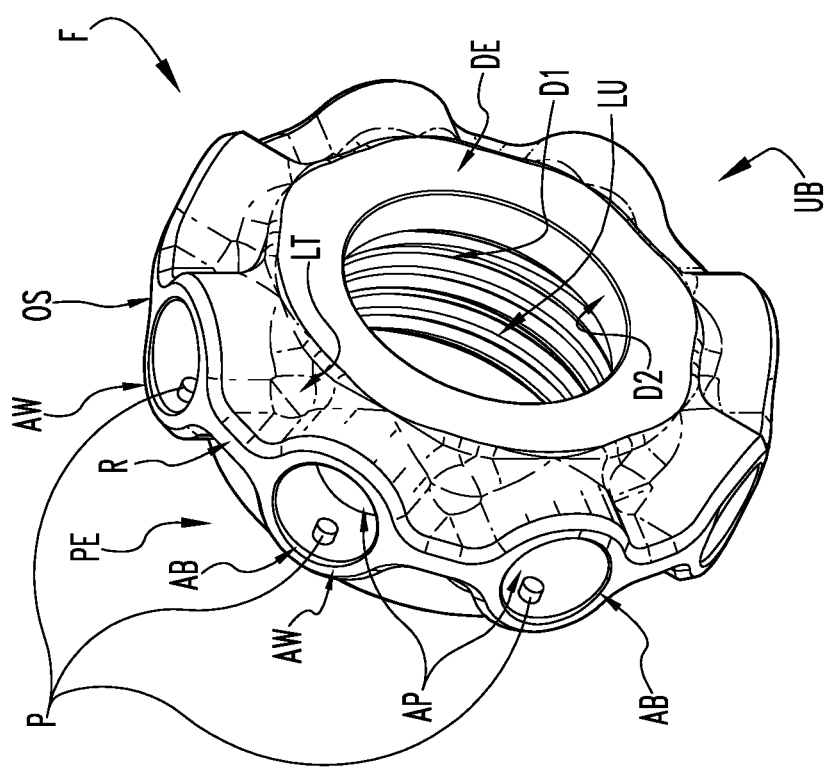
FIG. 3A provides a perspective view of an illustrative embodiment of the invention.

FIG. 3A depicts a perspective view of an illustrative fitting F of the invention, and FIG. 3B depicts a right hand elevation view of the embodiment depicted in FIG. 3A. As shown, the fitting F includes a unitary body UB having a length LE, a distal end DE, a proximal end PE, an outer surface OS, and a lumen LU. The outer surface OS generally extends around the length of the unitary body UB and across the face of the proximal and distal ends PE, DE.

The fitting F has a lumen LU that extends within the unitary body UB from the proximal end PE to the distal end DE so as to permit the flow of a fluid through the unitary body UB. The lumen LU is cylindrical and occupies a first diameter D1 and a second diameter D2. The first diameter D1 is greater than the second diameter D2, and the first diameter D1 includes threads that are configured to receive a threaded female sub end of a pipe (not shown). The threads start at the proximal end PE of the unitary body UB and extend distally into the first diameter D1 of the lumen LE and end at a proximal location from the distal end DE, at approximately the beginning of the second diameter D2, but the threads may terminate at any suitable location within the lumen LU.

The second diameter D2 can be such a size so as to catch the flange on a male sub end (not shown) in a manner to prevent the fitting F from being able to slide over the flange of the sub end. Alternatively, the second diameter D2 may be of sufficient size to permit the fitting F to slide over the flange of a male sub end, so as to permit the fitting F to be readily replaced or exchanged with another fitting F. In this embodiment, a set of segments (not shown) can be disposed around the male sub end to form a stop that catches the fitting F and prevents it from slipping off the male sub end during installation.

The unitary body UB depicted in FIGS. 3A and 3B also includes eight apertures AP disposed along the outer surface OS of the unitary body UB in a manner so as to form a part of the topography of the outer surface OS of the unitary body UB. Each aperture AP extends from the outer surface OS of the unitary body UB and ends within the unitary body UB. Each aperture AP is configured to receive a tool 100, as described herein, for rotating the fitting F around an axis AX that extends from the distal end DE to the proximal end PE so as to permit the tightening and loosening of the fitting F to a threaded female sub end of a pipe or tube. As shown in FIGS. 3A-3B, the axis AX extends along the center-line of the unitary body UB, however, in certain embodiments, the axis AX may be off-set, such as may be useful in an application where the lumen LU of unitary body UB is offset from the center line of the unitary body UB.

As shown in FIGS. 3A-3B, each aperture AP includes a protrusion P that extends from the wall AW of the aperture AP into the aperture AP. The protrusion P is of sufficient diameter and sufficiently extends into the aperture AP so as to releasably secure the tool 100 that can be used to loosen or tighten the fitting F. Although each depicted aperture AP is generally of a cylindrical shape, any shape may be used. Suitable such shapes can include rectangles, cubes, triangular and square based prisms, rectangular prisms, hexagonal prisms, elongated cylinders, cones, partial spheres, and the like. Moreover, the apertures AP may take any suitable form so as to permit a tool 100 to releasably engage the aperture AP so as to rotate fitting F around the axis AX and secure the seal between the male and female sub ends (not depicted). The apertures AP depicted in FIGS. 3A-3B have a sufficient depth AD and the walls of the apertures AW have sufficient thickness so as to permit the tool 100 to provide sufficient force so as to tighten the fitting F in a manner that seals the interface of the male and female sub ends without damaging the apertures AP or their walls AW.

Additionally, the apertures AP depicted in FIGS. 3A-3B have a bevel AB located along the inner wall of the aperture AP at the opening of the aperture AP. The bevel AB assists a user with insertion of the tool 100 within the aperture AP. In other embodiments, the bevels AB are not included, such as where the tool 100 is designed for easy insertion into the apertures AP.

As also shown in FIGS. 3A-3B, the outer surface OS of the fitting F also includes lower topographical LT portions that are adjacent to the walls AW of the apertures AP. The depth of the lower topographical LT portions can be varied, along with the aperture depth AD and thickness of the aperture wall AW so as to provide fittings F that are suitable for varying applications. In some applications, for example, a low profile may be needed for the fitting F, and in these applications, the depth of the apertures AD may need to be minimized and may even result in the elimination of lower topographical LT portions adjacent to the aperture wall AW. In normal clearance applications, the topography of the outer surface OS will typically provide for the presence of lower topographical LT portions adjacent to the aperture wall AW.

Figure 3D:
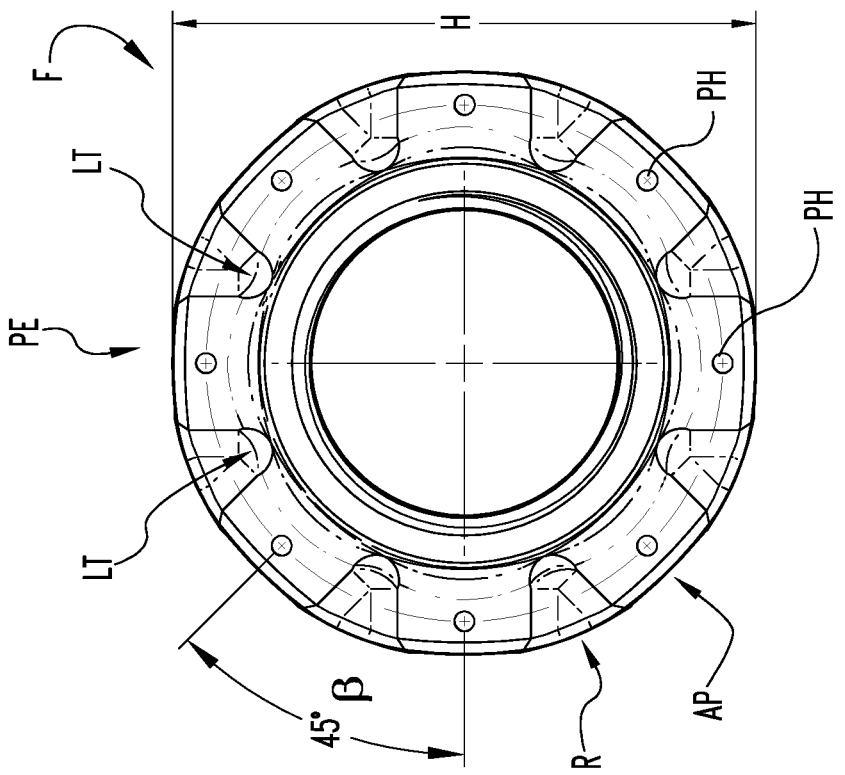
FIG. 3D provides a rear elevation view of the illustrative embodiment depicted in FIG. 3A.
Figure 3C:
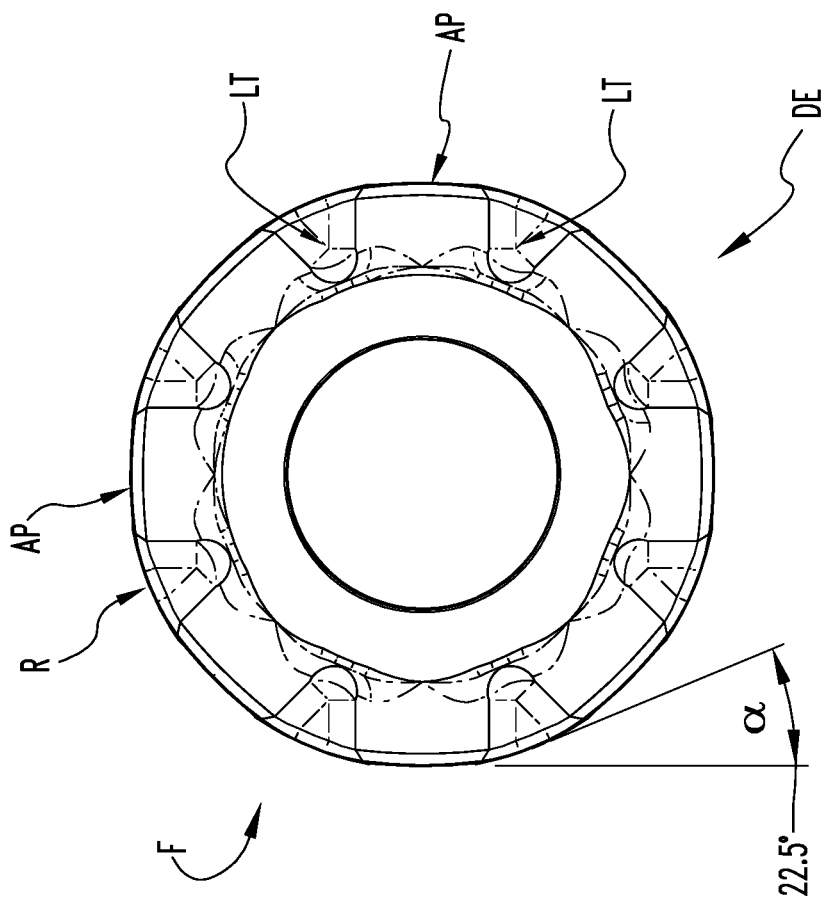
FIG. 3C provides a front elevation view of the illustrative embodiment depicted in FIG. 3A.

FIG. 3C provides a front elevation view of the distal end DE of the fitting F illustrated in FIG. 3A, and FIG. 3D provides a rear elevation view of the proximal end PE of the fitting F illustrated in FIG. 3A. As shown in FIGS. 3C-3D, the openings of each aperture AP occupy the same elevation of the outer surface OS so as to form a relatively flat overall opening height at each aperture AP. Each aperture AP is connected at its opening with a ridge R that extends from the lower topography LT between the apertures AP to the opening of the aperture AP. Although the depicted ridges R reach the aperture AP openings, in other embodiments, the ridges R may not reach the aperture AP openings, and may even occupy the same elevation as the lower topographies LT. In fact, in certain embodiments, the fitting F can have apertures AP that vary in height as compared to one another, if desirable.

As depicted in FIGS. 3C-3D, the fitting F appears generally circular from the side, and has a height H as can be measured by standing the fitting F on an opening of an aperture AP. Although the depicted fitting F appears circular from the side, the fitting F topography may vary thereby causing the side view to vary. For example, the number of apertures AP can vary from a single aperture AP, to more than eight. In an embodiment comprising only three apertures AP, for example, the side view of the fitting F may appear triangular, such as where the ridge R connecting the apertures AP has an elevation similar to the lower topography LT between the apertures AP. Likewise, a fitting F having only four apertures AP may have a square-like side view, such as where the ridges R extend to openings of the apertures AP and maintain their height between apertures AP.

Returning to FIGS. 3C-3D, the top surface of each ridge R line departs from the aperture wall AW at an angle of 22.5 degrees α, and given that the fitting F has eight apertures AP, they are generally disposed around the fitting F every 45 degrees β.

Turning to FIG. 3D, the each wall AW of each aperture AP on the proximal end of the fitting F includes a hole PH for locating the protrusion P into the aperture AP. In the depicted embodiment, the protrusion hole PH is one-quarter (¼) inches in diameter and the protrusion P is pressed into the hole using conventional techniques, such that it extends a distance of roughly five-thirty seconds (5⁄32) of an inch into the aperture AP. The hole PH can be any suitable shape, however, depending on the shape of the protrusion P, e.g. cylindrical, cuboid, or the like, and can be of any suitable dimension to accommodate the protrusion P. Moreover, the protrusion P may be formed into the fitting F during casting, as discussed below, thereby eliminating the need for a protrusion hole PH. In certain embodiments, the apertures AP can include two protrusion holes PH, such as when it is desirable for the protrusion P to extend across the diameter of the aperture AP. These embodiments can be desirable such as when the depth of the apertures AD are minimal and the tool 100 end is configured to catch the protrusion P so as to rotate the fitting F. Additionally, a fitting F can be constructed without any protrusions P, or may optionally include protrusions P in a subset of the total number of apertures AP on the fitting F.

As discussed herein, the fitting F can be modified to accommodate a variety of different services. For example, the dimensions of the fitting F depicted in FIGS. 3A-3D can be varied to accommodate the coupling of different sized pipe. The following table provides dimensions for an illustrative subset of piping applications.

| Pipe Size | 2" | 3" | 4" |
|---|---|---|---|
| H | 7⅛" | 8¼" | 10⅝" |
| LE | 2⅝" | 2¾" | 3¾" |
| AP Diameter | 1¼" | 1¼" | 1¼" |
| AD | 1⅛" | 1⅛" | 1⅛" |
| AW thickness | 5⁄32" | 5⁄32" | 5⁄32" |

As shown in the above table, the thickness of the aperture's wall AW, the diameter of the aperture AP, and the depth of the aperture AD, do not typically vary across different fitting F sizes. In some embodiments, however, it may be desirable to vary some of these dimensions depending on the overall fitting F design, such as its overall height, etc. As such, any suitable dimensions may be used in illustrative embodiments of the inventions, including but not limited to aperture AP diameters of one-half (½) inch, three-quarters (¾) of an inch, one (1) inch, one and a half (1½) inches, one and three-quarters (1¾) of an inch, or two (2) inches and the like. The depth of the aperture AD can be varied in a similar manner.

Figure 4B:
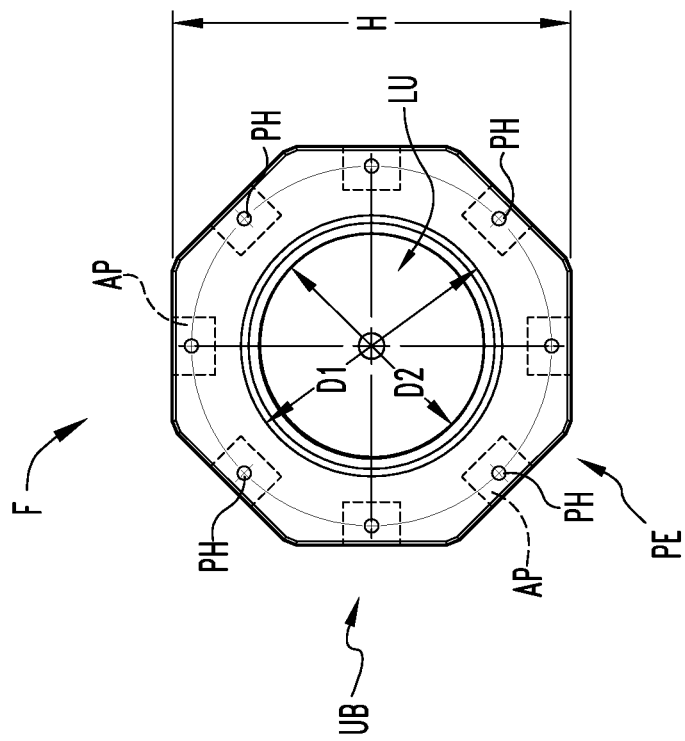
FIG. 4B provides a rear elevation view of the illustrative embodiment depicted in FIG. 4A.
Figure 4A:
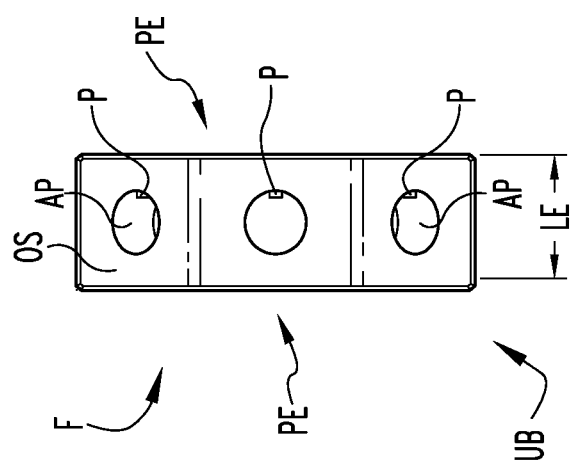
FIG. 4A provides a right hand elevation view of an illustrative embodiment of the invention.

FIG. 4A depicts a right hand elevation view of an illustrative fitting F of the invention, and FIG. 4B depicts a rear elevation view of the embodiment depicted in FIG. 4A. The depicted fitting F includes eight apertures AP, each of which includes a protrusion P for releasably securing a tool 100 for rotating the fitting F about an axis. The proximal end PE of the fitting F includes holes PH that secure the protrusions P into the fitting F, such as by way of a compression fitting F. The fitting F also has a distal end, which like the proximal end is generally flat. The fitting F appears generally octagonal from the side, and has a height H as can be measured by standing the fitting F on an opening of an aperture AP. The fitting F includes a unitary body UB having an outer surface OS that is of the same general elevation along the length LE of the unitary body UB, so as to eliminate any lower topography areas LT along the outer surface OS. The fitting F also has a cylindrical lumen LU having a first diameter D1 and second diameter D2. The first diameter D1 is greater than the second diameter D2, and the first diameter D1 includes threads that are configured to receive a threaded female sub end of a pipe (not shown). The threads start at the proximal end PE of the unitary body UB and extend distally into the first diameter D1 of the lumen LE and end at a proximal location from the distal end DE, at approximately the beginning of the second diameter D2.

Figure 5:
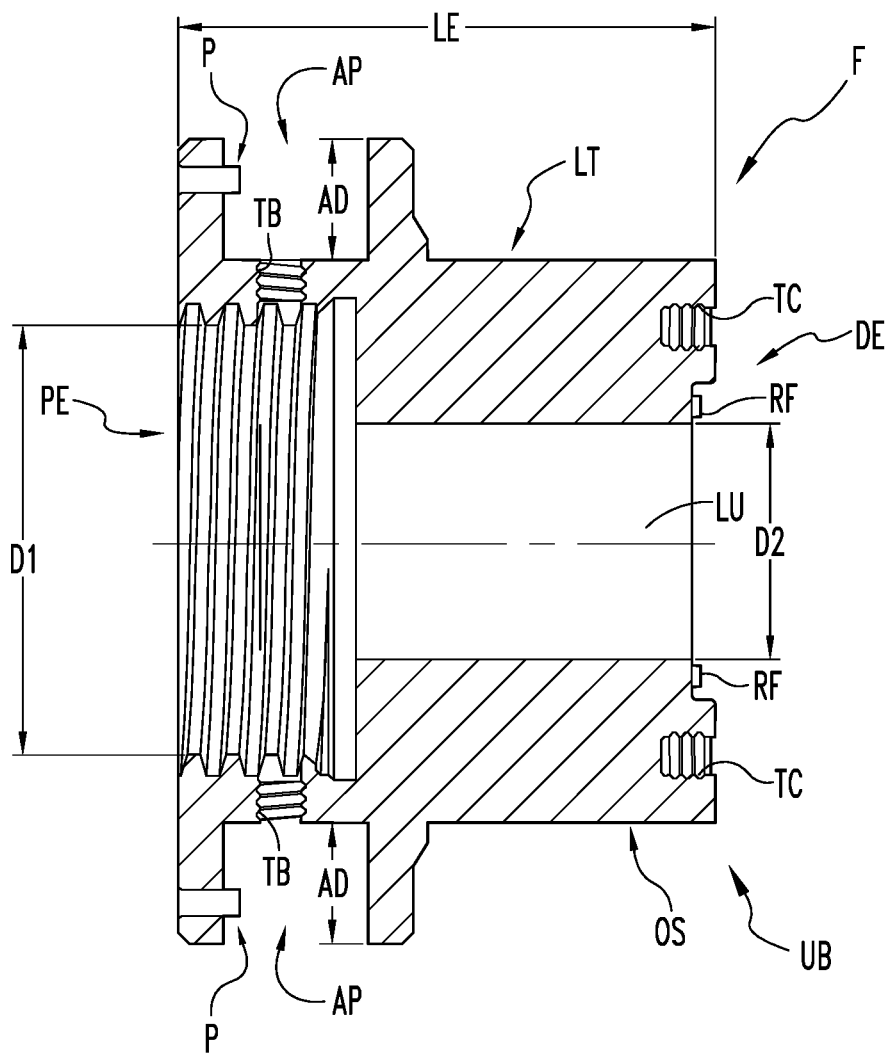
FIG. 5 provides a cross-sectional view of an illustrative embodiment of the invention.

FIG. 5 depicts a cross-sectional view of an illustrative fitting F of the invention. The fitting F has a unitary body UB having a length LE, a distal end DE, a proximal end PE, an outer surface OS, and a lumen LU. The outer surface OS extends around the length LE of the unitary body UB and across the face of the proximal end PE and the face of the distal end DE.

The fitting F has a lumen LU that extends within the unitary body UB from the proximal end PE to the distal end DE so as to permit the flow of fluid through the unitary body UB. The lumen LU is cylindrical in shape and occupies a first diameter D1 and a second diameter D2. The first diameter D1 is greater than the second diameter D2, and the first diameter D1 includes threads that are configured to receive threaded pipe. The threads start at the proximal end PE of the unitary body UB and extend distally into the first diameter D1 of the lumen LU.

The second diameter D2 is smaller than the first diameter D1 and uniformly extends to the distal end DE of the unitary body UB, where the unitary body UB is configured to connect to a flange on a piece of equipment (not shown). The distal end DE of the unitary body UB includes threaded recesses TC for receiving bolts to secure the flange of the equipment to the unitary body UB and can also include a raised face RF to help seal the flange connection when made up.

The depicted fitting F also includes a plurality of apertures AP disposed circumferentially around the proximal end PE of the unitary body UB. Each of the apertures AP extends from the outer surface OS of the unitary body UB and terminates at a location within the unitary body UB. Each aperture AP has a depth AD that is sufficient to receive a tool 100 for rotating the fitting F to tighten the threads of the proximal end PE to a pipe. Each aperture AP also includes a threaded bore TB that connects the aperture AP to a portion of the threads that reside beneath the aperture AP. The unitary body UB has a length LE that is sufficient for the service and can illustratively be three (3) inches, four (4) inches, five (5) inches, or the like. The unitary body UB also has a lower topographical region LT that is located distally of the outer surface OS that includes the apertures AP. As is the case for the illustrative embodiment of FIGS. 3A-3D, the outer surface OS of the unitary body UB of FIG. 5 can also include lower topographical LT regions between the aperture AP openings and ridges R (not shown).

In use, the proximal end PE of the fitting F depicted in FIG. 5 can be connected to the swivel head of a power swivel, such as a Logan 85 ton power swivel and tightened using an illustrative tool 100 of the invention. Once secure, threaded set bolts, which can include any suitable metal or polymer material, such as Teflon®, can be seated in the threaded bores TB of the fitting F. The set bolts are used to keep the swivel from backing out of the threaded part of the fitting F when it changes rotational direction. In this application, the distal end DE of the fitting F can be connected to an R&H Machine high pressure Swivel Assembly No. 10627-13 of Snubbing Swivel Style, which will permit the fitting F to rotate with the swivel head.

As illustrated, the length LE of the FIG. 5 fitting F is greater than the length of the fittings F of FIGS. 3A-3D and 4A-4B, and fitting lengths LE can vary depending on the particular application. Additionally the location of the apertures AP in relation to the length LE of the fitting F may also vary, and the apertures AP can be located within the same plane or can alternatively be offset from one another, again depending on the application and number of apertures AP on any particular fitting F. Although the lumen LU of the illustrated fittings F are generally cylindrical, the lumens can vary so as to occupy any void suitable for the service. For example, in some instances the lumen may form a T shape so as to permit multiple fluid exits in the FIG. 5 embodiment. Alternatively, the lumen may curve 90 degrees so as to permit a change in fluid direction through the fitting F. The lumen may also form a wide spot within the fitting F and then neck down at the outlet of FIG. 5, again depending on the service. Finally, the distal end of FIG. 5 can include any suitable fitting F to mate with another component, be it a threaded connection or a flange for bolting with a reciprocal flange on the other component.

The fittings F of the invention may be made of any suitable materials, such as copper, nickel, chromium, molybdenum, tungsten, carbon steel, stainless steel, such as 316 stainless, aluminum, and alloys or mixtures thereof, such as 4118, 4120, 4121, 4130, 4135, 4137, 4140, 4142, 4145, 4147, 4150, 4161 alloy steel and the like.

Certain embodiments of the invention also include a polymeric segment that can be used to cover the apertures AP of the fitting F and protect them from environmental conditions, such as rain followed by freezing conditions. Such segment can include raised areas that fit into each of the apertures AP and can easily be removed from the apertures AP. The segment can also include a portion for connecting the two ends of the segment after installation, such as interlocking pieces located at each end of the segment. Illustratively, the fitting F of the invention can also include drain ports located appropriately in the fittings F, such as at the bottom of each aperture AP, to serve as a drain for each of the apertures AP to avoid any damage from freezing conditions and the like.

Figure 6:
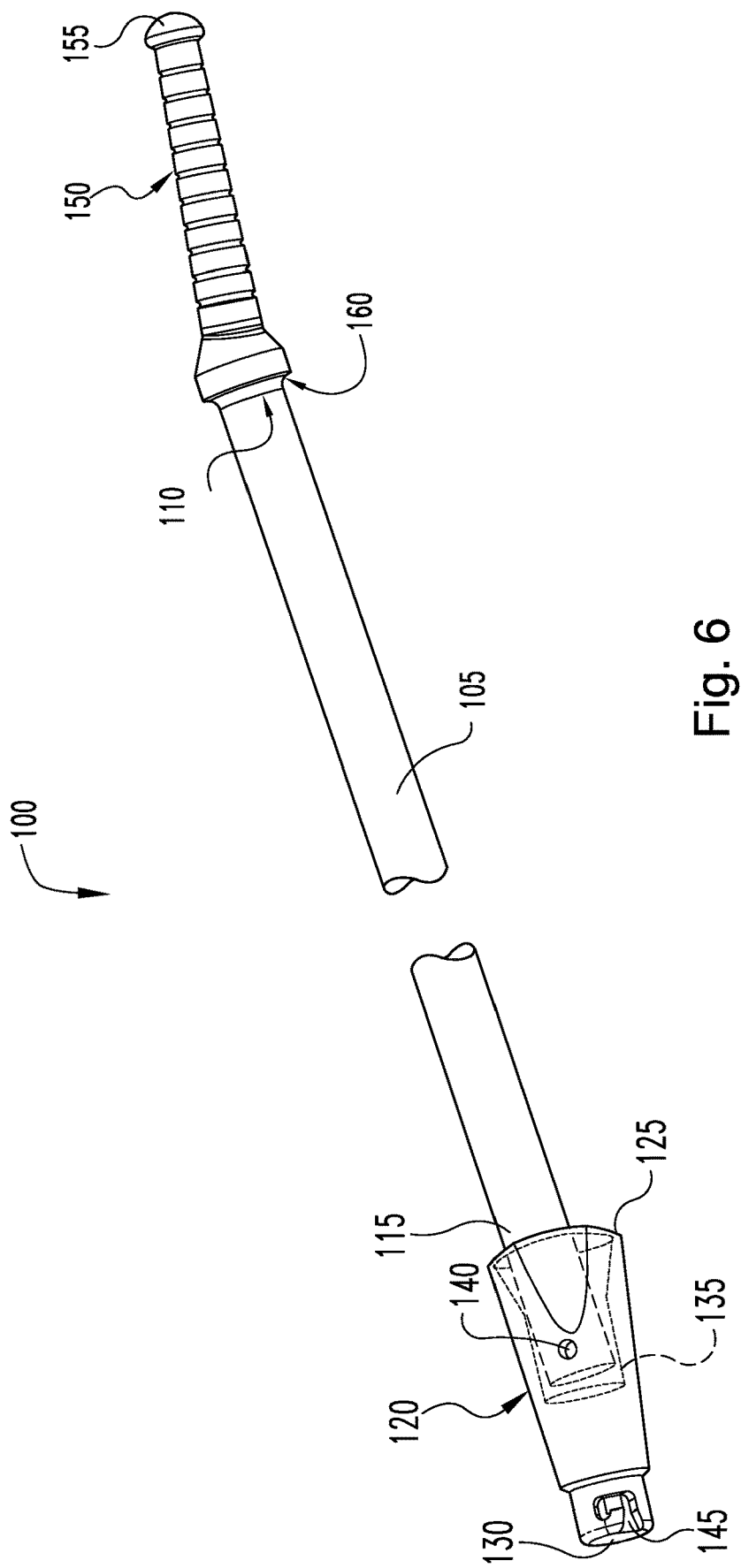
FIG. 6 provides a perspective view of an illustrative embodiment of the invention.

Turning now to FIG. 6, depicted is a tool 100 for use in tightening or loosening a fitting F that couples pipe or tubing. The tool 100 includes a bar 105 having a cylindrical elongate body, a proximal end 110, and a distal end 115. The tool 100 further comprises a bell head 120 having a proximal end 125 and a distal end 130. The proximal end 125 of the bell head 120 includes an aperture 135 that receives the distal end 115 of the elongated body 105. The distal end 115 of the elongated body 105 is affixed in the aperture 135 by a pin that is pressed into the bell head 120 after its disposition in the distal end 115 of the elongated body 105, such that the elongate body 105 can swing back and forth in a bi-direction manner within the aperture 135. Such swing can permit a user to gain some momentum on the elongate body when loosening a fitting F in order to help break the fitting F loose from its connection.

The distal end 130 of the depicted bell head 120 is cylindrical and is sized and configured to fit into an aperture AP of a fitting F described above. The distal end 130 of the bell head 120 also includes a "J" channel 145 for receiving a protrusion P of an aperture AP of a fitting F described herein. The "J" channel 145 permits the tool 100 to releasably interlock with the fitting F, such as when a user rotates the tool 100 while placing it into the aperture AP. In other embodiments, the distal end 130 of the bell head 120 can include other structures to releasably connect the tool 100 with the fitting F. In some embodiments, for example, the protrusion P can be spring loaded and the distal end 130 of the bell head 120 can include a small recess for mating with the spring loaded protrusion P so as to releasably connect the fitting F and the tool 100.

A valve tool 150 is depicted in FIG. 6 at the proximal end 110 of the elongate body 105. The valve tool 150 includes a distal end 160 and a proximal end 155, and occupies a diameter that narrows in a proximal direction from the distal end 160 of the valve tool 150 so as to permit the valve tool 150 to slide into the actuators of various sized ball valves to permit the operation of the valves.

The elongate body 105 can also include ridges R (not depicted), such as may run the length of the body in a diamond formation, to facilitate gripping of the bar, and the elongate body can also include a bore (not depicted) for use in connecting the bar to a safety lanyard. The tool 100 can be made of any suitable material, including carbon and stainless steel and their alloys.

The fittings F, bell head 120, and valve tool 150 can be formed during any suitable alloy casting process, such as sand casting or investment casting, as are known in the art. Illustrative sand casting processes include forming a mold of the component to be made in sand, followed by pouring molten metal into the casting so as to create a rough form of the component. Illustrative investment casting process include forming a wax pattern of the component to be made. A ceramic material is then coated onto the wax to make a mold for casting, and the wax is melted and removed from the mold. Molten metal is then poured into the ceramic mold and then cast to form the component. Investment casting techniques are suitable to form the fitting F and bell head 120 of the invention because they permit the castings to include the apertures AP discussed herein, thereby eliminated the step of boring the aperture AP into the fitting F and bell head 120 as discussed below, however either casting process can be used to form the components of the invention.

Figure 7C:
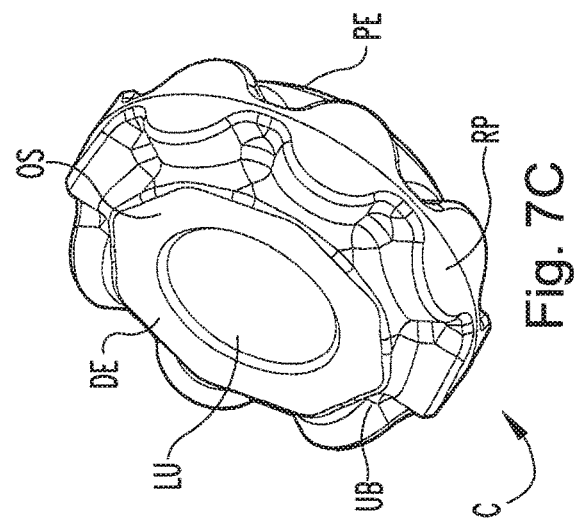
FIG. 7C provides a perspective view of the illustrative embodiment in FIG. 7A.
Figure 7B:
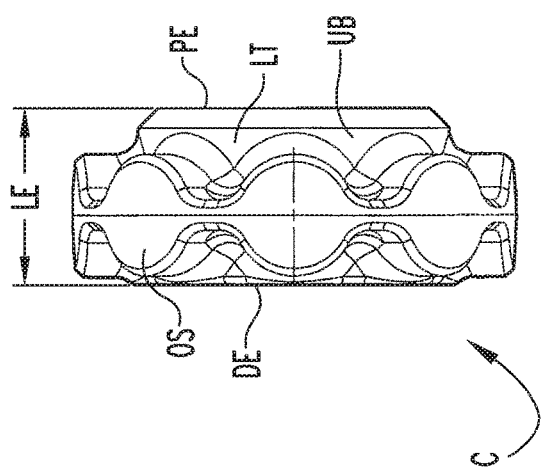
FIG. 7B provides a right hand elevation view of the illustrative embodiment in FIG. 7A.
Figure 7A:
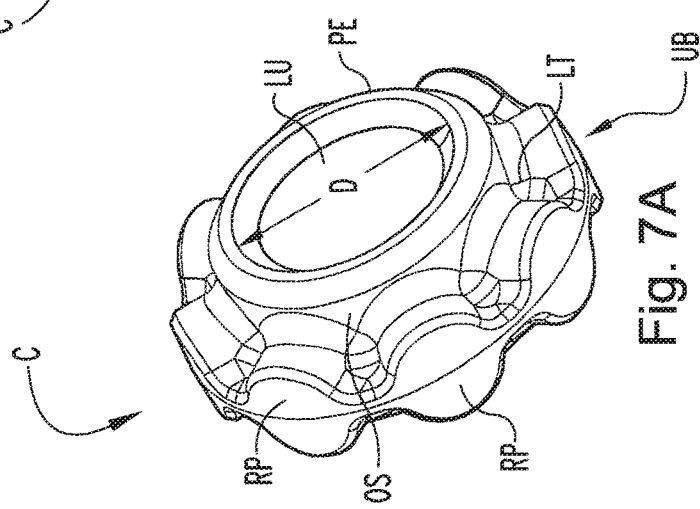
FIG. 7A provides a perspective view of an illustrative embodiment of the invention.

FIGS. 7A-7C depicts an illustrative casting C of a fitting F of the invention. The casting C forms a unitary body UB that has a length LE, a distal end DE, a proximal end PE, an outer surface OS, and a lumen LU. The outer surface OS extends around the length LE of the unitary body UB and across the face of the proximal and distal ends PE, DE, respectively. The lumen LE extends from the distal end DE of the unitary body UB to the proximal end PE of the unitary body UB so as to define a void within the unitary body UB.

The outer surface OS includes eight raised portions RP that extend radially outward from the center line of the lumen LU so as to raise the outer surface OS of the unitary body UB at each raised portion RP. The outer surface OS is also cast to include lower topographical portions LT that are adjacent to the raised portions RP. Each raised portion RP in the depicted FIGS. 7A-7B is cast as solid metal and is configured for boring so as to create an aperture AP in each raised portion RP. In alternative embodiments, as discussed above, the apertures AP can be cast into the fitting F so as to eliminate the boring step.

The lumen LU of the depicted casting C is cylindrical and includes a diameter D and is configured for threading using any suitable machining techniques as are known in the art. After the casting C of the FIG. 7A-7C embodiment is completed, each aperture AP is then bored using any suitable machining techniques as are known in the art and such bores can be made as part of the same process that locates threads into the diameter D of the lumen's LU proximal end PE. Additionally, protrusion holes PH can be drilled into the aperture walls AW after boring for receipt of the protrusions P which can be pressed through such holes, again using any suitable machining techniques.

All publications cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A fitting for use in coupling pipe or tubing, comprising:
a unitary body, said unitary body comprising a length, a distal end, a proximal end, an outer surface, and a lumen;
wherein said outer surface extends around said length of said unitary body between said proximal end and said distal end;
wherein said lumen extends within said unitary body in a distal direction from said proximal end of said unitary body, said lumen generally defining a void within said unitary body, wherein a portion of said lumen is cylindrical, said cylindrical portion further including threads configured to receive a threaded female sub end of a pipe or tube;
wherein said unitary body further comprises at least one aperture, said at least one aperture extending from an opening at said outer surface of said unitary body and ending at a location within said unitary body, said at least one aperture configured to receive a tool for rotating said fitting around an axis that extends from said distal end to said proximal end so as to permit the tightening and loosening of said fitting to a threaded female sub end of a pipe or tube;
wherein said ending location of said at least one aperture comprises an aperture wall that encloses said at least one aperture within said unitary body, thereby establishing an aperture depth that extends between said aperture wall and said opening of said at least one aperture; and
wherein at least one of said at least one aperture further includes a protrusion extending into said at least one aperture, said protrusion configured to releasably secure a tool for tightening and loosening said fitting.

2. The fitting of claim 1, wherein said at least one aperture comprises eight apertures.

3. The fitting of claim 2, wherein said unitary body comprises a generally circular side view.

4. The fitting of claim 3, wherein said unitary body comprises a height of 7⅛ inches when standing on an opening of an aperture.

5. The fitting of claim 3, wherein said outer surface comprises a variable topography.

6. The fitting of claim 3, wherein said proximal end is located 2⅝ inches from said distal end.

7. The fitting of claim 1, wherein said at least one aperture further comprises a cylindrical shape.

8. The fitting of claim 7, wherein said cylindrical shape comprises a diameter of at least one inch.

9. A fitting for use in coupling pipe or tubing, comprising:
a unitary body, said unitary body comprising a length, a distal end, a proximal end, an outer surface, and a lumen;
wherein said outer surface extends around said length of said unitary body between said proximal end and said distal end;
wherein said lumen extends within said unitary body in a distal direction from said proximal end of said unitary body, said lumen generally defining a void within said unitary body, wherein a portion of said lumen is cylindrical, said cylindrical portion further including threads configured to receive a threaded female sub end of a pipe or tube;
wherein said unitary body further comprises at least one aperture, said at least one aperture extending from an opening at said outer surface of said unitary body and ending at a location within said unitary body, said at least one aperture configured to receive a tool for rotating said fitting around an axis that extends from said distal end to said proximal end so as to permit the tightening and loosening of said fitting to a threaded female sub end of a pipe or tube;

wherein said ending location of said at least one aperture comprises an aperture wall that encloses said at least one aperture within said unitary body, thereby establishing an aperture depth that extends between said aperture wall and said opening of said at least one aperture; and wherein at least one of said at least one aperture further includes a beveled surface at said opening of said at least one aperture so as to facilitate insertion of a tool for tightening and loosening said fitting.

10. The fitting of claim 9, wherein said unitary body comprises 4130 alloy steel.

11. The fitting of claim 9, wherein said threads begin at said proximal end of said unitary body and extend distally into said cylindrical lumen portion, wherein said threads end prior to said distal end of said unitary body.

12. The fitting of claim 9, wherein said portion of said cylindrical lumen extends from said proximal end of said unitary body to said distal end of said unitary body so as to permit the flow of a fluid through said cylindrical lumen.

13. The fitting of claim 12, wherein said cylindrical lumen further comprises a first diameter and a second diameter, wherein said first diameter includes said threads that are configured to receive a threaded female sub end of a pipe or tube, and wherein said second diameter is configured to be disposed over a male sub end of a pipe or tube.

* * * * *